United States Patent
Takahashi

(10) Patent No.: US 12,266,958 B2
(45) Date of Patent: Apr. 1, 2025

(54) CHARGING DEVICE AND CHARGING SYSTEM

(71) Applicant: Shimano Inc., Osaka (JP)

(72) Inventor: Toshihiko Takahashi, Osaka (JP)

(73) Assignee: Shimano Inc., Osaka (JP)

( * ) Notice: Subject to any disclaimer, the term of this patent is extended or adjusted under 35 U.S.C. 154(b) by 429 days.

(21) Appl. No.: 17/884,174

(22) Filed: Aug. 9, 2022

(65) Prior Publication Data

US 2023/0054799 A1 Feb. 23, 2023

(30) Foreign Application Priority Data

Aug. 20, 2021 (JP) ................................ 2021-135219

(51) Int. Cl.
*H02J 7/00* (2006.01)
*B60L 3/00* (2019.01)
*B60L 53/14* (2019.01)

(52) U.S. Cl.
CPC .......... *H02J 7/0036* (2013.01); *B60L 3/0046* (2013.01); *H02J 7/00308* (2020.01); *B60L 53/14* (2019.02); *B60L 2200/12* (2013.01); *Y02T 90/14* (2013.01)

(58) Field of Classification Search
CPC ..... H02J 7/0036; H02J 7/00308; Y02T 90/14; B60L 3/0046; B60L 53/14; B60L 2200/12
USPC ............................................ 320/109; 701/22
See application file for complete search history.

(56) References Cited

U.S. PATENT DOCUMENTS

| | | |
|---|---|---|
| 2013/0134936 A1 | 5/2013 | Kaneyasu et al. |
| 2016/0114693 A1 | 4/2016 | Tsuno |
| 2016/0207409 A1* | 7/2016 | Ueo .................. B60L 50/16 |

FOREIGN PATENT DOCUMENTS

| | | |
|---|---|---|
| DE | 11 2018 002 477 T5 | 9/2020 |
| DE | 11 2019 000 099 T5 | 10/2020 |
| JP | 2014-155377 A | 8/2014 |

* cited by examiner

*Primary Examiner* — Zixuan Zhou
(74) *Attorney, Agent, or Firm* — Global IP Counselors, LLP

(57) ABSTRACT

A charging device basically includes a first power source, first and second device-side connection terminals, a first resistance, a detection unit and a device-side controller. The first resistance is connected between the first power source and the first device-side connection terminal. The detection unit detects an inter-terminal voltage between the first device-side connection terminal and the second device-side connection terminal. A vehicle-side controller is connected between a first vehicle-side connection terminal connected to the first device-side connection terminal and a second vehicle-side connection terminal connected to the second device-side connection terminal. The device-side controller determines that the charging-device-side charging connector and the vehicle-side charging connector are turned into a non-connected state from a connected state by a fact that the inter-terminal voltage detected by the detection unit becomes greater than a predetermined voltage.

17 Claims, 8 Drawing Sheets

CHARGING DEVICE AND CHARGING SYSTEM

CROSS-REFERENCE TO RELATED APPLICATIONS

This application claims priority to Japanese Patent Application No. 2021-135219, filed on Aug. 20, 2021. The entire disclosure of Japanese Patent Application No. 2021-135219 is hereby incorporated herein by reference.

BACKGROUND

Technical Field

The present disclosure generally relates to a charging device and a charging system.

Background Information

There has been proposed a charging device that charges a battery that is provided in a vehicle by using a commercial power source. The charging device detects a change from a non-connected state into a connected state, and then starts to charge the battery. The non-connection state is a state where a charging-device-side charging connector and a vehicle-side charging connector are not connected to each other. On the other hand, the connection state is a state where the charging-device-side charging connector and the vehicle-side charging connector are connected to each other. One example of such a charging device is disclosed in Japanese Laid-Open Patent Publication No. 2014-155377.

SUMMARY

The present disclosure provides a charging device and a charging system capable of detecting a change from a connected state into a non-connected state. The connection state is a state where a charging-device-side charging connector and a vehicle-side charging connector are connected to each other, and the non-connection state is a state where the charging-device-side charging connector and the vehicle-side charging connector are not connected to each other.

A charging device according to a first aspect of the present disclosure is provided for charging a vehicle-side electric storage unit of a vehicle-side device having a first vehicle-side connection terminal, a second vehicle-side connection terminal and a vehicle-side controller electrically connected between the first vehicle-side connection terminal and the second vehicle-side connection terminal. The charging device includes: a first power source; a first device-side connection terminal, a second device-side connection terminal a first resistance, a detection unit and a device-side controller. The first device-side connection terminal is connectable to the first vehicle-side connection terminal. The second device-side connection terminal is connectable to a second vehicle-side connection terminal. The first resistance is electrically connected between the first power source and the first device-side connection terminal. The detection unit is configured to detect an inter-terminal voltage between the first device-side connection terminal and the second device-side connection terminal. The device-side controller is configured to determine a change from a connected state to a non-connected state has occurred upon determining the inter-terminal voltage detected by the detection unit is greater than a predetermined voltage. The connected state is a state where the first device-side connection terminal and the first vehicle-side connection terminal are connected to each other and the second device-side connection terminal and the second vehicle-side connection terminal are connected to each other. The non-connected state is a state where the first device-side connection terminal and the first vehicle-side connection terminal are not connected to each other and the second device-side connection terminal and the second vehicle-side connection terminal are not connected to each other. According to the first aspect, the charging device is capable of detecting a change from the connected state into the non-connected state.

A charging device according to a second aspect of the first aspect includes: a second power source; a third device-side connection terminal; a fourth device-side connection terminal; and a shutting unit. The third device-side connection terminal is connectable to a third vehicle-side connection terminal. The fourth device-side connection terminal is connectable to a fourth vehicle-side connection terminal. The shutting unit is configured to shut off a current supplying route through which a current is supplied from the second power source to the third device-side connection terminal. According to the second aspect, the charging device shuts off the current supplying route by using the shutting unit, so that it is possible to stop energization from the second power source to vehicle-side electric storage unit.

In a charging device according to a third aspect of the second aspect, the first device-side connection terminal and the third device-side connection terminal are terminals that are individually provided, and the second device-side connection terminal is a terminal that also serves as the fourth device-side connection terminal. According to the third aspect, the charging device uses the device-side connector terminal also as the fourth device-side connection terminal, so that it is possible to reduce the number of connection terminals.

In a charging device according to a fourth aspect of the second aspect or the third aspect, the device-side controller is configured to cause the shutting unit to shut off the current supplying route in a state where the device-side controller determines the change has occurred from the connected state to the non-connected state. According to the fourth aspect, the charging device is capable of shutting off the current supplying route just after determining a change from the connected state into the non-connected state.

In a charging device according to a fifth aspect of any one of the first to the fourth aspects, a second resistance is connected between the first vehicle-side connection terminal and the second vehicle-side connection terminal electrically in parallel to the vehicle-side controller. According to the fifth aspect, the first device-side connection terminal and the first vehicle-side connection terminal are connected to each other, and thus the charging device is capable of reducing the inter-terminal voltage.

In a charging device according to a sixth aspect of the fifth aspect, a resistance value of the first resistance is smaller than a resistance value of the second resistance. According to the sixth aspect, the charging device is capable of reducing voltage that is output from the first power source in order to supply voltage needed for operating the vehicle-side controller.

In a charging device according to a seventh aspect of any one of the first to the sixth aspects, a resistance value of the first resistance is set such that a voltage equal to or more than a lowest voltage needed for operation of the vehicle-side controller is output from the first device-side connection terminal. The charging device according to the seventh aspect is capable of supplying voltage needed for operating the vehicle-side controller.

In a charging device according to an eighth aspect of the seventh aspect, a voltage value of the lowest voltage is 5 [V], and a voltage value of the first power source is 7 [V]. According to the eighth aspect, the charging device is capable of supplying voltage needed for operating the vehicle-side controller even if a voltage value of the first power source is reduced to 7 [V].

In a charging device according to a ninth aspect of the eighth aspect, a voltage value of the predetermined voltage is between a voltage value of the first power source and a voltage value of the lowest voltage. According to the ninth aspect, the charging device is capable of detecting a change from the connected state into the non-connected state without a voltage value that is higher than a voltage value of the first power source, so that it is possible to supply voltage needed for operating the vehicle-side controller under the connected state.

In a charging device according to a tenth aspect of the fifth aspect or the sixth aspect, the detection unit includes a comparator that compares the inter-terminal voltage and the predetermined voltage with each other. According to the tenth aspect, the detection unit is capable of comparing the inter-terminal voltage and the predetermined voltage by using a simple electric circuit.

A charging device according to an eleventh aspect of the tenth aspect further includes: a third resistance electrically connected to the first power source; and a fourth resistance electrically connected between the third resistance and the second device-side connection terminal. The comparator is configured to compare the inter-terminal voltage and the predetermined voltage between the third resistance and the fourth resistance with each other. According to the eleventh aspect, the charging device is capable of generating the predetermined voltage that is smaller than a voltage value of the first power source by using the third resistance and the fourth resistance that is electrically and serially connected between the first power source and the second device-side connection terminal.

In a charging device according to a twelfth aspect of the eleventh aspect, a resistance value of the fourth resistance is greater than five times of a resistance value of the third resistance. According to the eleventh aspect, for example, in a case where a voltage of the first power source is 7 [V] and the lowest voltage is 5 [V], the charging device is capable of generating the predetermined voltage whose voltage value is 6 [V] to 7 [V].

In a charging device according to a thirteenth aspect of the eleventh aspect or the twelfth aspect, a resistance value of the third resistance is greater than a hundred times of a resistance value of the first resistance. According to the thirteenth aspect, the charging device is capable of generating the predetermined voltage by using current that is smaller than one hundredth of current flowing from the first power source to the first device-side connection terminal.

In a charging device according to a fourteenth aspect of any one of the eleventh to the thirteenth aspects, a resistance value of the first resistance is 10 [Ω], and a resistance value of the second resistance is 50 [Ω]. According to the fourteenth aspect, for example, in a case where a voltage of the first power source is 7 [V], a charging device is capable of setting a voltage value of the inter-terminal voltage under the non-connected state to 7 [V], and a voltage value of the inter-terminal voltage under the connected state to greater than 5 [V] and smaller than 6 [V].

In a charging device according to a fifteenth aspect of any one of the eleventh to the fourteenth aspects, a resistance value of the third resistance is 5 [kΩ], and a resistance value of the fourth resistance is 50 [kΩ]. According to the fifteenth aspect, for example, in a case where a voltage of the first power source is 7 [V] and the lowest voltage is 5 [V], the charging device is capable of generating the predetermined voltage whose voltage value is 6 [V] to 7 [V].

A charging device according to a sixteenth aspect of any one of the first to the fifteenth aspects further includes: a device-side control terminal that is connectable to a vehicle-side control terminal. According to the sixteenth aspect, the charging device is capable of acquiring information needed for charging from the vehicle-side controller via the device-side control terminal that is different from a connection terminal for supplying electric power.

In a charging device according to a seventeenth aspect of any one of the first to the sixteenth aspects, the device-side controller is configured to determine the change has occurred from the non-connected state to the connected state upon determining the inter-terminal voltage detected by the detection unit has become smaller than the predetermined voltage. According to the seventeenth aspect, the charging device is capable of detecting a change from the non-connected state into the connected state.

A charging system according to an eighteenth aspect includes: the charging device according to any one of the eleventh to the seventeenth aspects; and further includes the vehicle-side device of which the vehicle-side controller is electrically connected between the first vehicle-side connection terminal and the second vehicle-side connection terminal. According to eighteenth aspect, the charging device is capable of detecting a change from the connected state into the non-connected state.

According to the present disclosure, a charging device is capable of detecting a change from a connected state into a non-connected state; the connected state is a state where a charging-device-side charging connector and a vehicle-side charging connector are connected to each other, and the non-connected state is a state where the charging-device-side charging connector and the vehicle-side charging connector are not connected to each other.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
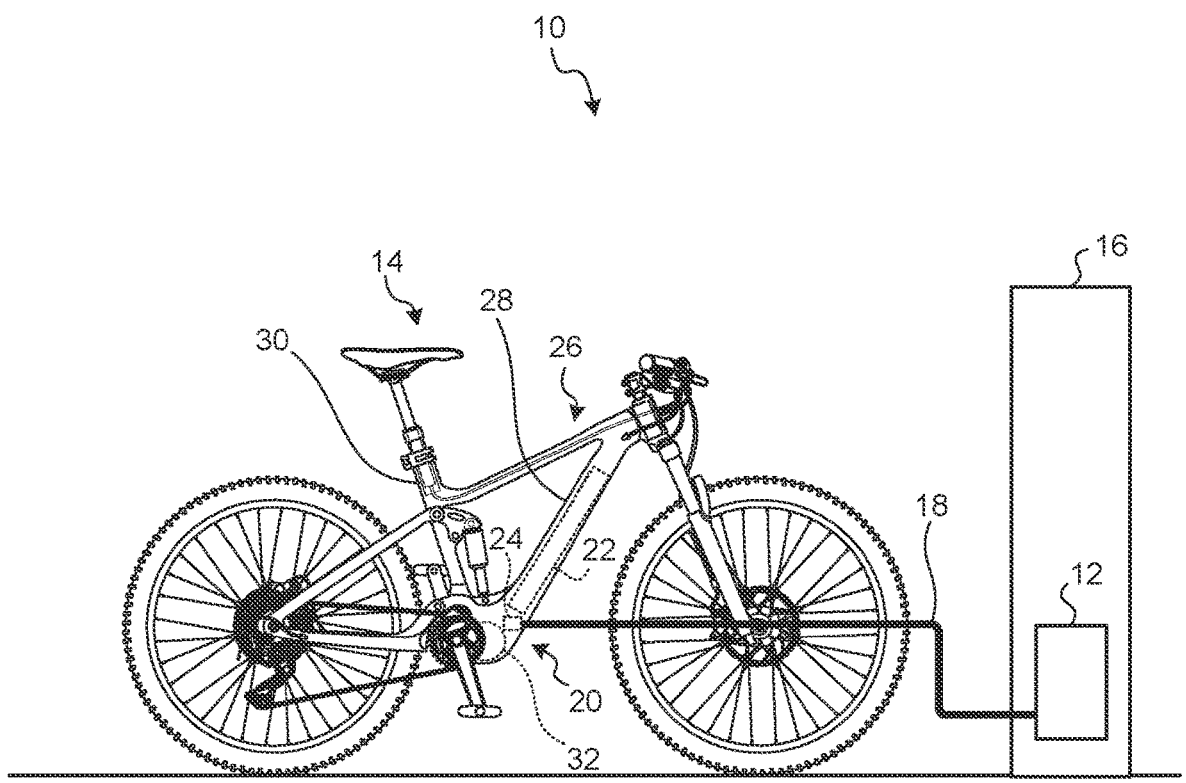
FIG. 1 is a diagram illustrating a charging system according to an embodiment.

As illustrated in FIG. 1, a charging system 10 according to an embodiment includes a charging device 12 and a vehicle 14. The charging device 12 is provided in a charging station 16, for example. The charging station 16 is arranged on the street, for example. The charging station 16 includes a charging cable 18 that electrically connects the charging device 12 and the vehicle 14 to each other.

The vehicle 14 is a bicycle having an electric assistance function, for example. The vehicle 14 can be an electric motorcycle, an electric automobile, a plug-in hybrid automobile, or the like as long as being a vehicle including an electric storage unit that is configured to be charged by a commercial power source.

The vehicle 14 includes a vehicle-side device 20. The vehicle-side device 20 includes a vehicle-side electric storage unit 22 and a vehicle-side controller 24. The vehicle-side electric storage unit 22 is a lithium-ion battery, for example. The vehicle-side electric storage unit 22 can be an arbitrary secondary battery that is other than a lithium-ion battery as long as being a battery capable of being charged by electric power that is supplied from the charging device 12. The vehicle-side electric storage unit 22 is housed in a frame 26 of the vehicle 14. The vehicle-side electric storage unit 22 is housed in a down tube 28 of the frame 26, for example. The vehicle-side electric storage unit 22 can be configured to be attached to the outside of the frame 26.

The vehicle-side controller 24 is housed in the frame 26. The vehicle-side controller 24 is housed in a coupler between the down tube 28 and a seat tube 30 in the frame 26, for example. The vehicle-side controller 24 can be housed in another portion other than the coupler between the down tube 28 and the seat tube 30 in the frame 26. The vehicle-side controller 24 can be configured to be attached to the outside of the frame 26.

The vehicle-side controller 24 is a Micro Processor Unit (MPU), for example. Thus, the vehicle-side controller 24 includes at least one processor. The vehicle-side controller 24 is configured to control operations of all electric components in the vehicle 14. The vehicle-side controller 24 is configured to control operations of a drive unit 32 in the vehicle 14, for example. The vehicle-side controller 24 can also be referred to as a vehicle-side electronic controller, or just referred to as an electronic controller. Thus, the terms "electronic controller" and "controller" as used herein refers to hardware that executes a software program, and does not include a human being. The drive unit 32 includes an electric motor, for example. The electric motor operates by using electric power that is supplied from the vehicle-side electric storage unit 22. The drive unit 32 is configured such that the vehicle-side controller 24 executes operation control on the electric motor so as to provide propelling force to a human-powered vehicle. The vehicle-side controller 24 executes control related to charging of the vehicle-side electric storage unit 22.

Figure 2:
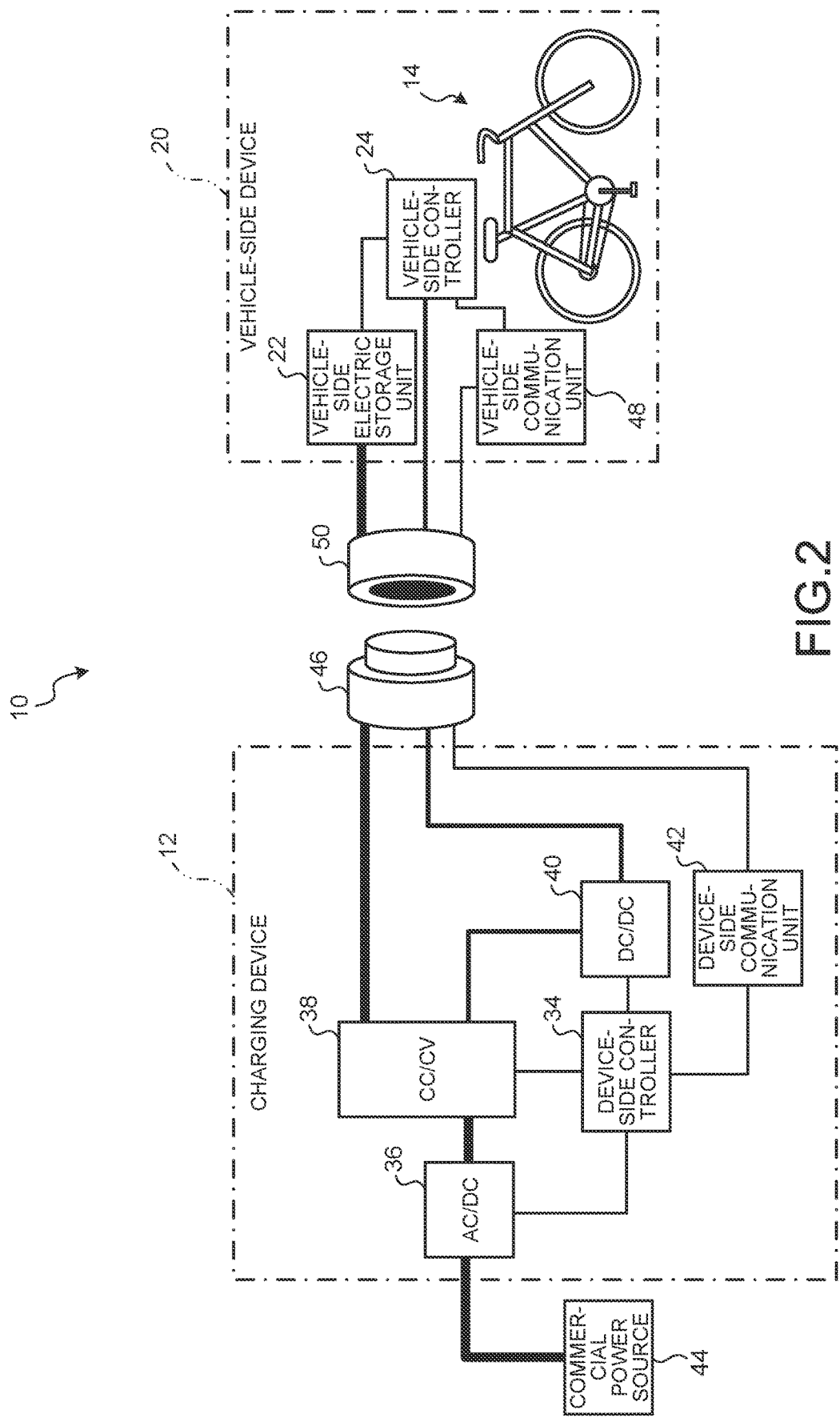
FIG. 2 is a schematic diagram illustrating configurations of a charging device and a vehicle-side device according to the embodiment.

As illustrated in FIG. 2, the charging system 10 includes the charging device 12 and the vehicle-side device 20. The charging device 12 includes a device-side controller 34, an alternate-current/direct-current converter (AC/DC) 36, a constant-current/constant-voltage charger (CC/CV) 38, a direct-current/direct-current converter (DC/DC) 40, and a device-side communication unit 42. The device-side communication unit 42 is a communication unit according to a Controller Area Network (CAN) standard, for example. The device-side communication unit 42 can be a communication unit according to a Power Line Communication (PLC) standard. The device-side communication unit 42 can be a communication unit according to a Universal Asynchronous Receiver Transmitter (UART) standard.

The device-side controller 34 is electrically connected to the AC/DC 36, the CC/CV 38, the DC/DC 40, and the device-side communication unit 42. The AC/DC 36 is electrically connected to a commercial power source 44 and the CC/CV 38. The CC/CV 38 is electrically connected to a charging-device-side charging connector 46. The DC/DC 40 is electrically connected to the CC/CV 38 and the charging-device-side charging connector 46. The device-side communication unit 42 is electrically connected to the charging-device-side charging connector 46.

The device-side controller 34 is an MPU, for example, so as to execute overall control on the charging device 12. Thus, the device-side controller 34 includes at least one processor. The device-side controller 34 can also be referred to as a device-side controller electronic controller, or just referred to as an electronic controller. A device-side controller 34 controls operations of the AC/DC 36, the CC/CV 38, and the DC/DC 40, for example. The device-side controller 34 executes informational communication with the vehicle-side device 20 via the device-side communication unit 42. The device-side controller 34 receives information related to charging of the vehicle-side electric storage unit 22 from the vehicle-side device 20. The device-side controller 34 receives information on, for example, an individual identification number Identification Number (ID) of the vehicle 14, a type number of the vehicle-side electric storage unit 22, State Of Charge (SOC) of the vehicle-side electric storage unit 22, a temperature of the vehicle-side electric storage unit 22, and the like from the vehicle-side device 20.

The AC/DC 36 converts alternate current input from the commercial power source 44 into direct current, and outputs the converted current to the CC/CV 38. The CC/CV 38 converts a voltage value of the current input from the AC/DC 36 into a voltage value of a predetermined constant voltage. The current value of current output to the CC/CV 38 is a current value that is appropriate for charging the vehicle-side electric storage unit 22. The current value of current is a current value that is greater than 0 [A] and is smaller than 40 [A], for example. A voltage value of the constant voltage is a voltage value that is appropriate for charging the vehicle-side electric storage unit 22. A voltage value of the constant voltage is a voltage value that is greater than 0 [V] and is smaller than 60 [V], for example. A rated voltage value of the constant voltage is 48 [V], for example. A rated voltage value of the constant voltage can be 36 [V], for example. In the present embodiment, the CC/CV 38 is explained to convert a voltage value of current input from the AC/DC 36 into a voltage value of a predetermined constant voltage. However, the CC/CV 38 can use a current value of current input from the AC/DC 36 as a current value of the predetermined constant current.

The CC/CV 38 outputs direct current converted into the constant voltage to the charging-device-side charging connector 46 and the DC/DC 40. The DC/DC 40 converts a voltage value of direct current input from the CC/CV 38 into a predetermined voltage value that is equal to or more than the lowest voltage needed for operating the vehicle-side controller 24, and outputs the converted voltage to the charging-device-side charging connector 46. The lowest voltage needed for operating the vehicle-side controller 24 is 5 [V], for example.

The vehicle-side device 20 includes the vehicle-side electric storage unit 22, the vehicle-side controller 24, and a vehicle-side communication unit 48. The vehicle-side controller 24 is electrically connected to the vehicle-side electric storage unit 22 and the vehicle-side communication unit 48. The vehicle-side electric storage unit 22 is electrically connected to a vehicle-side charging connector 50. The vehicle-side communication unit 48 is electrically connected to the vehicle-side charging connector 50.

The vehicle-side controller 24 executes informational communication with the charging device 12 via the vehicle-side communication unit 48. The vehicle-side controller 24 transmits information related to charging of the vehicle-side electric storage unit 22 to the charging device 12. The vehicle-side controller 24 transmits information on, for example, an individual identification number ID of the vehicle 14, a type number of the vehicle-side electric storage unit 22, an SOC of the vehicle-side electric storage unit 22, a temperature of the vehicle-side electric storage unit 22, and the like to the charging device 12. A user of the vehicle 14 connects the charging-device-side charging connector 46 and the vehicle-side charging connector 50 with each other so as to charge the vehicle-side electric storage unit 22. The vehicle-side controller 24 executes informational communication with electric components in the vehicle 14. For example, the vehicle-side controller 24 executes informational communication with the vehicle-side electric storage unit 22. The vehicle-side controller 24 executes informational communication with electric components in the vehicle 14 by using CAN communication protocol, for example. In a case where a communication standard for executing informational communication with the charging device 12 is different from a communication standard for executing informational communication with an electric component in the vehicle 14, the vehicle-side controller 24 may include a conversion unit of a communication standard.

A connection surface of the vehicle-side charging connector 50 with the charging-device-side charging connector 46 is configured to be exposed from the frame 26 of the vehicle 14. For example, an opening and closing cover is attached to the vehicle-side charging connector 50, which protects the connection surface with the charging-device-side charging connector 46. The cover is configured to open when the vehicle-side electric storage unit 22 is charged, and further to close when the vehicle-side electric storage unit 22 is not charged.

Figure 3:
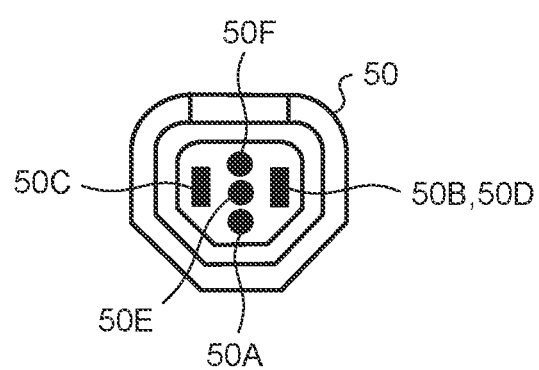
FIG. 3 is a diagram illustrating a vehicle-side charging connector according to the embodiment.

As illustrated in FIG. 3, the vehicle-side charging connector 50 includes a first vehicle-side connection terminal 50A, a second vehicle-side connection terminal 50B, a third vehicle-side connection terminal 50C, and a fourth vehicle-side connection terminal 50D on a connection surface thereof with the charging-device-side charging connector 46. The first vehicle-side connection terminal 50A, the second vehicle-side connection terminal 50B, and the third vehicle-side connection terminal 50C are terminals that are different from each other. The second vehicle-side connection terminal 50B is the same terminal as the fourth vehicle-side connection terminal 50D.

The vehicle-side charging connector 50 further includes a plurality of vehicle-side control terminals. Specifically, the vehicle-side charging connector 50 includes a first vehicle-side control terminal 50E and a second vehicle-side control terminal 50F on a connection surface thereof with the charging-device-side charging connector 46. The second vehicle-side control terminal 50F is a terminal that is different from the first vehicle-side control terminal 50E. The first vehicle-side connection terminal 50A, the second vehicle-side connection terminal 50B, the third vehicle-side connection terminal 50C, the fourth vehicle-side connection terminal 50D, the first vehicle-side control terminal 50E, and the second vehicle-side control terminal 50F are concavely-formed connection terminals such as female terminals. In other words, the vehicle-side charging connector 50 is formed as a female connector, which can also be referred to as a jack, an outlet, or a receptacle.

The first vehicle-side connection terminal 50A is a high-voltage-side (+) terminal for supplying electric power to the vehicle-side controller 24. The second vehicle-side connection terminal 50B is a low-voltage-side (−) terminal for supplying electric power to the vehicle-side controller 24. The third vehicle-side connection terminal 50C is a high-voltage-side (+) terminal for charging the vehicle-side electric storage unit 22. The fourth vehicle-side connection terminal 50D is a low-voltage-side (−) terminal for charging the vehicle-side electric storage unit 22. The first vehicle-side control terminal 50E is an input/output terminal of a High-signal in CAN communication protocol. The second vehicle-side control terminal 50F is an input/output terminal of a Low-signal in CAN communication protocol.

Figure 4:
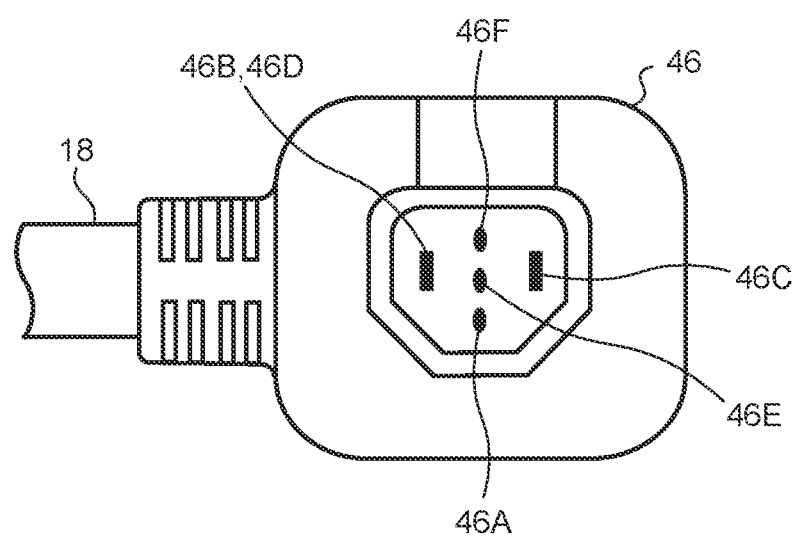
FIG. 4 is a diagram illustrating a charging-device-side charging connector according to the embodiment.

As illustrated in FIG. 4, the charging-device-side charging connector 46 is attached to a leading end of the charging cable 18. A base end of the charging cable 18 is connected to the charging device 12. The charging-device-side charging connector 46 includes a first device-side connection terminal 46A, a second device-side connection terminal 46B, a third device-side connection terminal 46C, and a fourth device-side connection terminal 46D, on a connection surface thereof with the vehicle-side charging connector 50. The first device-side connection terminal 46A, the second device-side connection terminal 46B, and the third device-side connection terminal 46C are terminals that are different from each other. The second device-side connection terminal 46B is the same terminal as the fourth device-side connection terminal 46D.

The charging-device-side charging connector 46 further includes a plurality of device-side control terminals. Specifically, the charging-device-side charging connector 46 includes a first device-side control terminal 46E and a second device-side control terminal 46F, on a connection surface thereof with the vehicle-side charging connector 50. The second device-side control terminal 46F is a terminal that is different from the first device-side control terminal 46E. The first device-side connection terminal 46A, the second device-side connection terminal 46B, the third device-side connection terminal 46C, the fourth device-side connection terminal 46D, the first device-side control terminal 46E, and the second device-side control terminal 46F are convexly-formed connection terminals such as male terminals. In other words, the charging-device-side charging connector 46 is formed as a male connector, which can also be referred to as a plug. The charging-device-side charging connector 46 keeps an engagement state thereof with respect to the vehicle-side charging connector 50 with the use of frictional force alone. In other words, a latch mechanism is not provided, which executes control for keeping an engagement state between the charging-device-side charging connector 46 and the vehicle-side charging connector 50.

The first device-side connection terminal 46A is a high-voltage-side (+) terminal for supplying electric power to the vehicle-side controller 24. The second device-side connection terminal 46B is a low-voltage-side (−) terminal for supplying electric power to the vehicle-side controller 24. The third device-side connection terminal 46C is a high-voltage-side (+) terminal for charging the vehicle-side electric storage unit 22. The fourth device-side connection terminal 46D is a low-voltage-side (−) terminal for charging the vehicle-side electric storage unit 22. The first device-side control terminal 46E is an input/output terminal of a High-signal in CAN communication protocol. The second device-side control terminal 46F is an input/output terminal of a Low-signal in CAN communication protocol.

It is desired that the charging device 12 stops charging simultaneously when a connected state is changed into a non-connected state from a connected state. The connected state is a state where the charging-device-side charging connector 46 is connected to the vehicle-side charging connector 50, and the non-connected state is a state where the charging-device-side charging connector 46 is not connected to the vehicle-side charging connector 50. The charging-device-side charging connector 46 keeps an engagement state thereof with respect to the vehicle-side charging connector 50 with the use of frictional force alone, and thus a user is able to pull out the charging-device-side charging connector 46 from the vehicle-side charging connector 50 under a state where the charging device 12 is applying a voltage that is appropriate for charging the vehicle-side electric storage unit 22.

However, for example, the device-side controller 34 communicates with the vehicle-side controller 24 using CAN communication protocol with a predetermined period, for example, a period of 100 ms, and thus, in a case where a connected state is changed into a non-connected state during a non-communication time interval, the change from the connected state into the non-connected state is not able to be determined in real time. Thus, the charging device 12 is not able to stop applying a voltage, which is appropriate for charging the vehicle-side electric storage unit 22, to the charging-device-side charging connector 46 simultaneously when a connected state is changed into a non-connected state, in some cases.

Therefore, a possibility exists that when a user pulls out the charging-device-side charging connector 46 from the vehicle-side charging connector 50 in a state where application of the voltage from the charging device 12 to the charging-device-side charging connector 46 is being continued, for example, if the user touches the third device-side connection terminal 46C, the voltage appropriate for charging the vehicle-side electric storage unit 22 is applied to the user.

Therefore, the charging system 10 according to the embodiment is configured to determine a change from a connected state into a non-connected state simultaneously when the charging-device-side charging connector 46 is pulled out from the vehicle-side charging connector 50.

Figure 5:
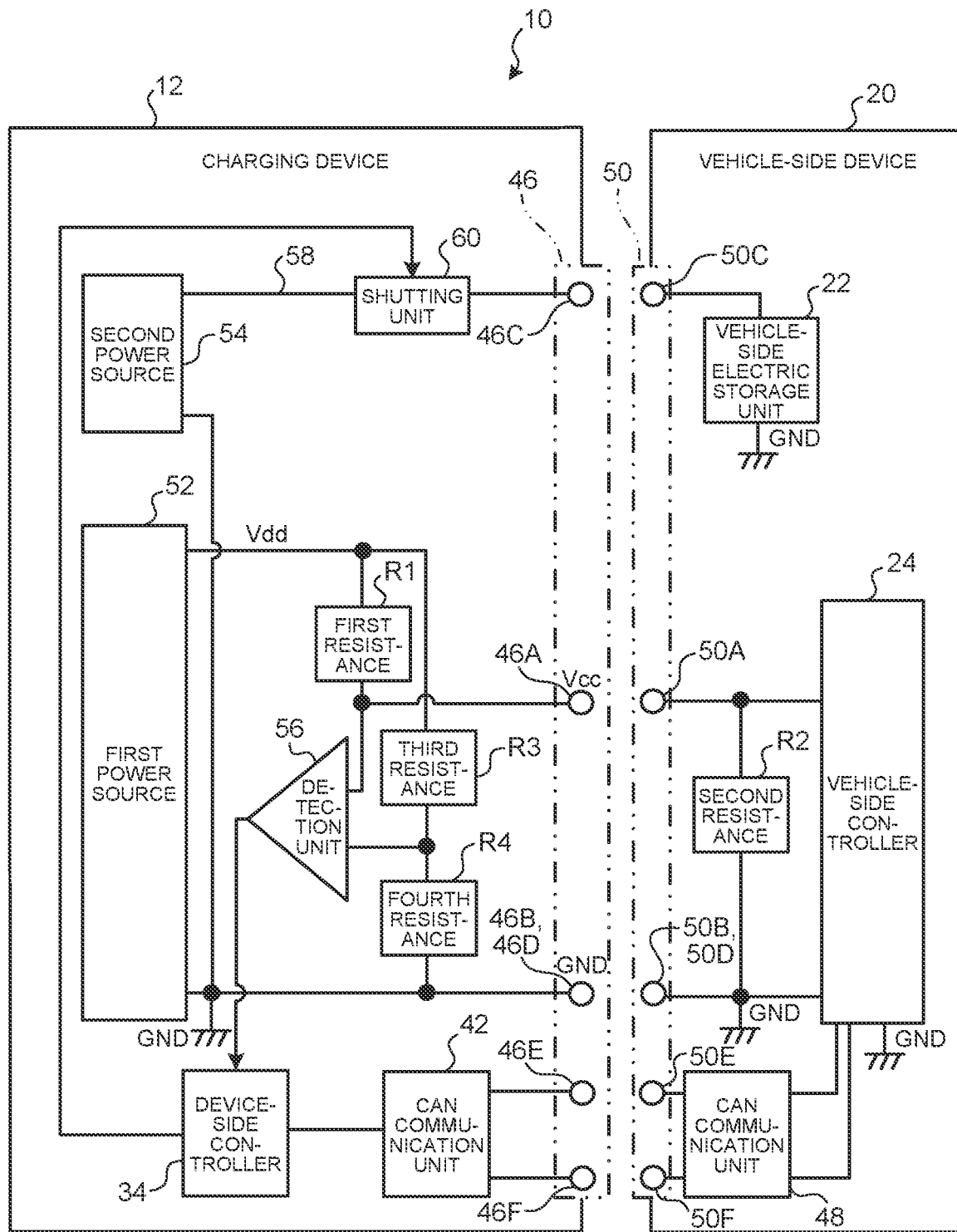
FIG. 5 is a circuit diagram illustrating the charging device and the vehicle-side device according to the embodiment.

Specifically, as illustrated in FIG. 5, the charging device 12 includes a first power source 52, the first device-side connection terminal 46A that is connectable to the first vehicle-side connection terminal 50A, and the second device-side connection terminal 46B that is connectable to the second vehicle-side connection terminal 50B. The first power source 52 is the DC/DC 40 illustrated in FIG. 2. The charging device 12 further includes a first resistance R1 that is electrically connected between the first power source 52 and the first device-side connection terminal 46A. A resistance value of the first resistance R1 is 10 [Ω], for example.

The charging device 12 further includes a detection unit 56 that detects an inter-terminal voltage between the first device-side connection terminal 46A and the second device-side connection terminal 46B, and the device-side controller 34. The vehicle-side controller 24 is electrically connected between the first vehicle-side connection terminal 50A and the second vehicle-side connection terminal 50B. The detection unit 56 is a comparator that compares an inter-terminal voltage between the first device-side connection terminal 46A and the second device-side connection terminal 46B with a predetermined voltage. A voltage value of the predetermined voltage is between a voltage value of the first power source 52 and a voltage value of the lowest voltage needed for operating the vehicle-side controller 24.

The charging device 12 includes a second power source 54, the third device-side connection terminal 46C that is connectable to the third vehicle-side connection terminal 50C, and the fourth device-side connection terminal 46D that is connectable to the fourth vehicle-side connection terminal 50D. The first device-side connection terminal 46A is a terminal that is different from the third device-side connection terminal 46C. The second device-side connection terminal 46B is the same terminal as the fourth device-side connection terminal 46D. The second power source 54 is different from the first power source 52. The second device-side connection terminal 46B and the fourth device-side connection terminal 46D are connected to the ground (GND). The fourth device-side connection terminal 46D can be a terminal that is different from the second device-side connection terminal 46B.

The first vehicle-side connection terminal 50A is a terminal that is different from the third vehicle-side connection terminal 50C. The second vehicle-side connection terminal 50B is the same terminal as the fourth vehicle-side connection terminal 50D. The second vehicle-side connection terminal 50B and the fourth vehicle-side connection terminal 50D are connected to the ground (GND). The fourth vehicle-side connection terminal 50D can be a terminal that is different from the second vehicle-side connection terminal 50B. The vehicle-side electric storage unit 22 is electrically connected between the third vehicle-side connection terminal 50C and the fourth vehicle-side connection terminal 50D. The charging device 12 further includes a shutting unit 60 that shuts off a current supplying route 58 via which current is supplied from the second power source 54 to the third device-side connection terminal 46C.

A second resistance R2 is electrically connected between the first vehicle-side connection terminal 50A and the second vehicle-side connection terminal 50B in parallel with the vehicle-side controller 24. A resistance value of the second resistance R2 is 50 [Ω], for example. A resistance value of the first resistance R1 is smaller than a resistance value of the second resistance R2. A resistance value of the first resistance R1 is set such that a voltage, which is equal to or more than the lowest voltage needed for operating the vehicle-side controller 24, is output from the first device-side connection terminal 46A. The voltage value of the lowest voltage needed for operating the vehicle-side controller 24 is 5 [V], for example. A voltage value Vdd of the first power source 52 is 7 [V], for example.

The charging device 12 further includes a third resistance R3 that is electrically connected to the first power source 52, and a fourth resistance R4 that is electrically connected between the third resistance R3 and the second device-side connection terminal 46B. A resistance value of the fourth resistance R4 is greater than five times of a resistance value of the third resistance R3. A resistance value of the third resistance R3 is greater than a hundred times of a resistance value of the first resistance R1. For example, a resistance value of the third resistance R3 is 5 [kΩ]. A resistance value of the fourth resistance R4 is 50 [kΩ]. A comparator of the detection unit 56 compares an inter-terminal voltage between the first device-side connection terminal 46A and the second device-side connection terminal 46B with a predetermined voltage between the third resistance R3 and the fourth resistance R4.

The charging device 12 includes device-side control terminals that are connectable to the vehicle-side control terminals. The device-side control terminals include the first device-side control terminal 46E that is connectable to the first vehicle-side control terminal 50E, and the second device-side control terminal 46F that is connectable to the second vehicle-side control terminal 50F.

In a state where the charging-device-side charging connector 46 and the vehicle-side charging connector 50 are changed from a non-connected state into a connected state, the charging device 12 supplies electric power to the vehicle-side device 20 so as to charge the vehicle-side electric storage unit 22. The charging device 12 detects that the charging-device-side charging connector 46 and the vehicle-side charging connector 50 are changed from a non-connected state to a connected state on the basis of a voltage value Vcc of the first device-side connection terminal 46A.

The first power source 52 always supplies voltage to the first device-side connection terminal 46A. In a state where the first device-side connection terminal 46A and the first vehicle-side connection terminal 50A are not connected to each other and the second device-side connection terminal 46B and the second vehicle-side connection terminal 50B are not connected to each other, the voltage value Vcc is equal to the voltage value Vdd.

In a case where the charging-device-side charging connector 46 is connected to the vehicle-side charging connector 50, the first power source 52 supplies electric power needed for communication to the vehicle-side device 20. In a case where the first device-side connection terminal 46A and the first vehicle-side connection terminal 50A are connected to each other and the second device-side connection terminal 46B and the second vehicle-side connection terminal 50B are connected to each other, current flows through the second resistance R2, and thus the voltage value Vcc decreases by an amount corresponding to the first resistance R1. In a case where detecting that the voltage value Vcc of the first device-side connection terminal 46A decreases from the voltage value Vdd, the device-side controller 34 is capable of recognizing that the charging-device-side charging connector 46 and the vehicle-side charging connector 50 are connected to each other.

If the charging-device-side charging connector 46 is pulled out from the vehicle-side charging connector 50, the voltage value Vcc rises up to the voltage value Vdd. The device-side controller 34 detects the rise in the voltage value Vcc to be able to recognize that the charging-device-side charging connector 46 is pulled out from the vehicle-side charging connector 50.

Figure 6:
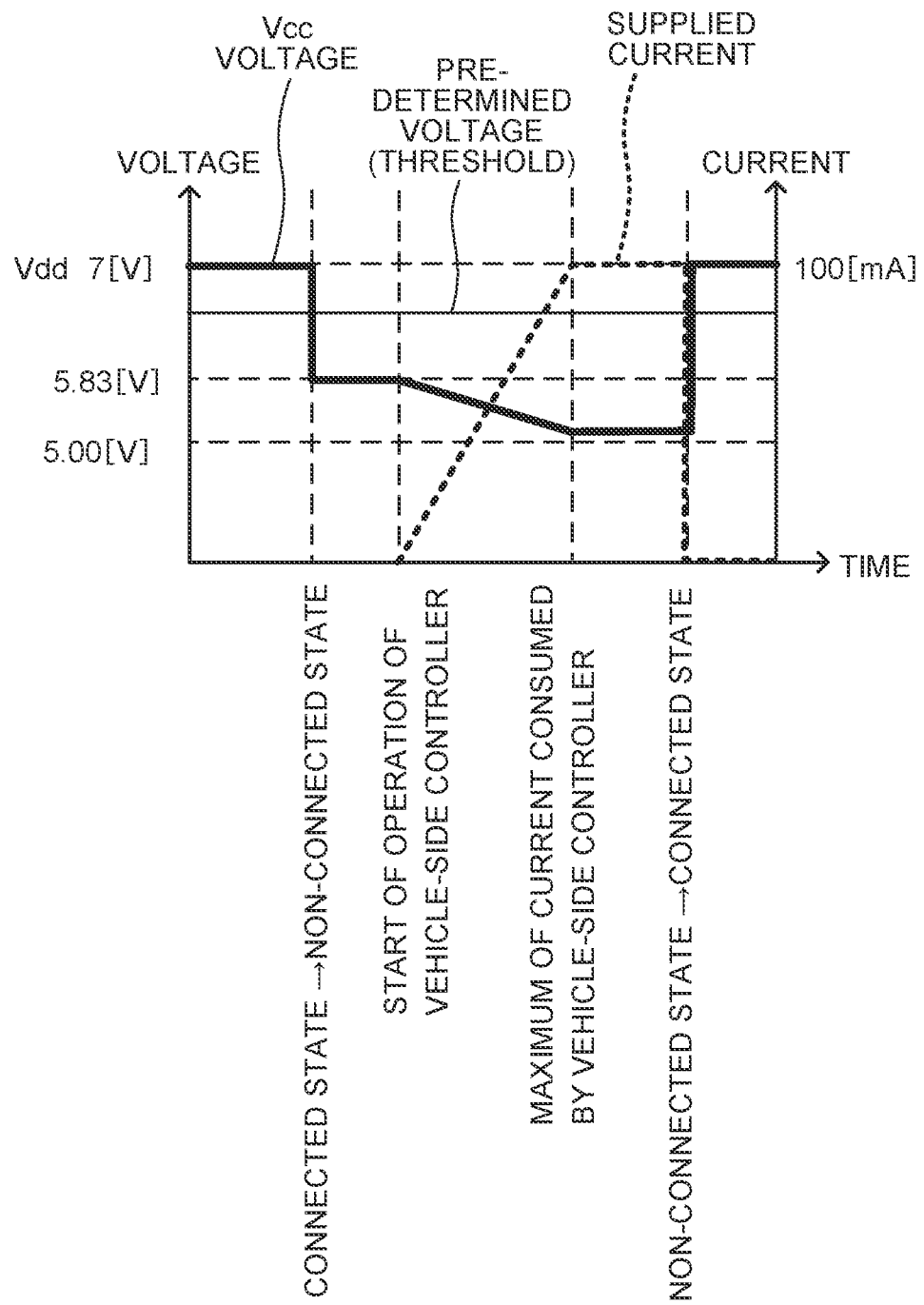
FIG. 6 is a diagram illustrating operations of the charging system according to the embodiment.

For example, in order to supply a voltage equal to or more than 5 [V] to the vehicle-side controller 24, the voltage value Vdd is necessarily a voltage value that is higher than 5 [V]. Hereinafter, a case will be explained where the voltage value Vdd of the first power source 52 is 7[V], a resistance value of the first resistance R1 is 10 [Ω], and a resistance value of the second resistance R2 is 50 [Ω]. As illustrated in FIG. 6, if the charging-device-side charging connector 46 and the vehicle-side charging connector 50 are in a non-connected state, the voltage value Vcc is 7 [V].

In a case where the charging-device-side charging connector 46 and the vehicle-side charging connector 50 are changed from a non-connected state into a connected state and the vehicle-side controller 24 does not operate, the voltage value Vcc is approximately 6 [V] (for example, 5.83 [V]). Next, if the vehicle-side controller 24 starts to operate, the voltage value Vcc further decreases from 5.83 [V].

In a case where current greater than 100 [mA] does not flow through the vehicle-side controller 24, the voltage value Vcc becomes a voltage value that is greater than 5 [V] even if the vehicle-side controller 24 consumes the maximum current. The voltage value Vcc changes between 5.83 [V] and 5 [V], in the detection unit 56, a predetermined voltage for comparing with the voltage value Vcc is prescribed between 7 [V] and 5.83 [V]. Thus, a resistance value r3 of the third resistance R3 and a resistance value r4 of the fourth resistance R4 are decided by the following formula (1).

$$r4 \geq 5 \times r3 \tag{1}$$

The formula (1) is satisfied in a case where a resistance value r1 of the first resistance R1, a resistance value r2 of the second resistance R2, and an input resistance value rf of the vehicle-side controller 24 satisfy the above-mentioned condition. Otherwise, another formula based on a similar concept is needed.

In a case where the voltage value Vdd of the first power source 52 is 7 [V], the voltage value Vcc of the first device-side connection terminal 46A is decided by the following formula (2).

$$Vcc = r2'/(r1+r2') \times 7 \text{ [V]} \tag{2}$$

Note that r2' is a synthesized resistance value of r2 and the vehicle-side controller 24. In a case where of "r2>rf", an input resistance value rf of the vehicle-side controller 24 dominantly decides input resistance. In a case where of "r2<rf", r2 dominantly decides an input resistance value. In a case where an input current value IF of the vehicle-side controller 24 is prescribed as "IF<100 [mA]", the voltage value Vcc satisfies 5[V]<Vcc<6 [V].

In a case where the voltage value Vcc is smaller than the predetermined voltage, the detection unit 56 informs the device-side controller 34 of the fact. The device-side controller 34 determines a change from a non-connected state into a connected state by the fact that an inter-terminal voltage detected by the detection unit 56 becomes smaller than the predetermined voltage. Specifically, the device-side controller 34 determines a change from a non-connected state into a connected state in the charging-device-side charging connector 46 and the vehicle-side charging connector 50 by the fact that the voltage value Vcc of the first device-side connection terminal 46A, which is detected by the detection unit 56, becomes smaller than the predetermined voltage.

During a time interval where the charging-device-side charging connector 46 and the vehicle-side charging connector 50 are in a non-connected state, the device-side controller 34 shuts off the current supplying route 58 by using the shutting unit 60. In a case where determining that the charging-device-side charging connector 46 and the vehicle-side charging connector 50 are changed from a non-connected state into a connected state, the device-side controller 34 receives information related to the vehicle-side device 20 from the vehicle-side device 20 via the device-side communication unit 42.

For example, the device-side controller 34 receives information on an individual identification number ID of the vehicle 14, a type number of the vehicle-side electric storage unit 22, an SOC of the vehicle-side electric storage unit 22, a temperature of the vehicle-side electric storage unit 22, and the like form the vehicle-side device 20. The device-side controller 34 executes authentication recognition on the vehicle-side device 20 on the basis of the received information, determines whether or not charging is possible, and sets a condition related to charging. In a case where charging is possible and setting of the condition related to charging has been completed, the device-side controller 34 releases the current supplying route 58 from a shut-off state by using the shutting unit 60. Thus, current is supplied from the second power source 54 to the vehicle-side electric storage unit 22 so as to start to charge the vehicle-side electric storage unit 22.

Next, the device-side controller 34 is configured to determine a change from a connected state to a non-connected state has occurred upon determining the inter-terminal voltage detected by the detection unit 56 is greater than a predetermined voltage. As mentioned above, the connected state being a state where the first device-side connection terminal 46A and the first vehicle-side connection terminal 50A are connected to each other and the second device-side connection terminal 46B and the second vehicle-side connection terminal 50B are connected to each other, and the non-connected state being a state where the first device-side connection terminal 46A and the first vehicle-side connection terminal 50A are not connected to each other and the second device-side connection terminal 46B and the second vehicle-side connection terminal 50B are not connected to each other. In other words, the device-side controller 34 determines a change from a connected state into a non-connected state by the fact that the voltage value Vcc of the first device-side connection terminal 46A becomes greater than a predetermined voltage. In a case where determining that a connected state has changed into a non-connected state, the device-side controller 34 causes the shutting unit 60 to shut off the current supplying route 58.

As described above, according to the charging device 12, the first device-side connection terminal 46A is able to be used as both of a terminal for supplying electric power to the vehicle-side controller 24 and a connection/disconnection detecting terminal between the charging-device-side charging connector 46 and the vehicle-side charging connector 50.

Figure 7:
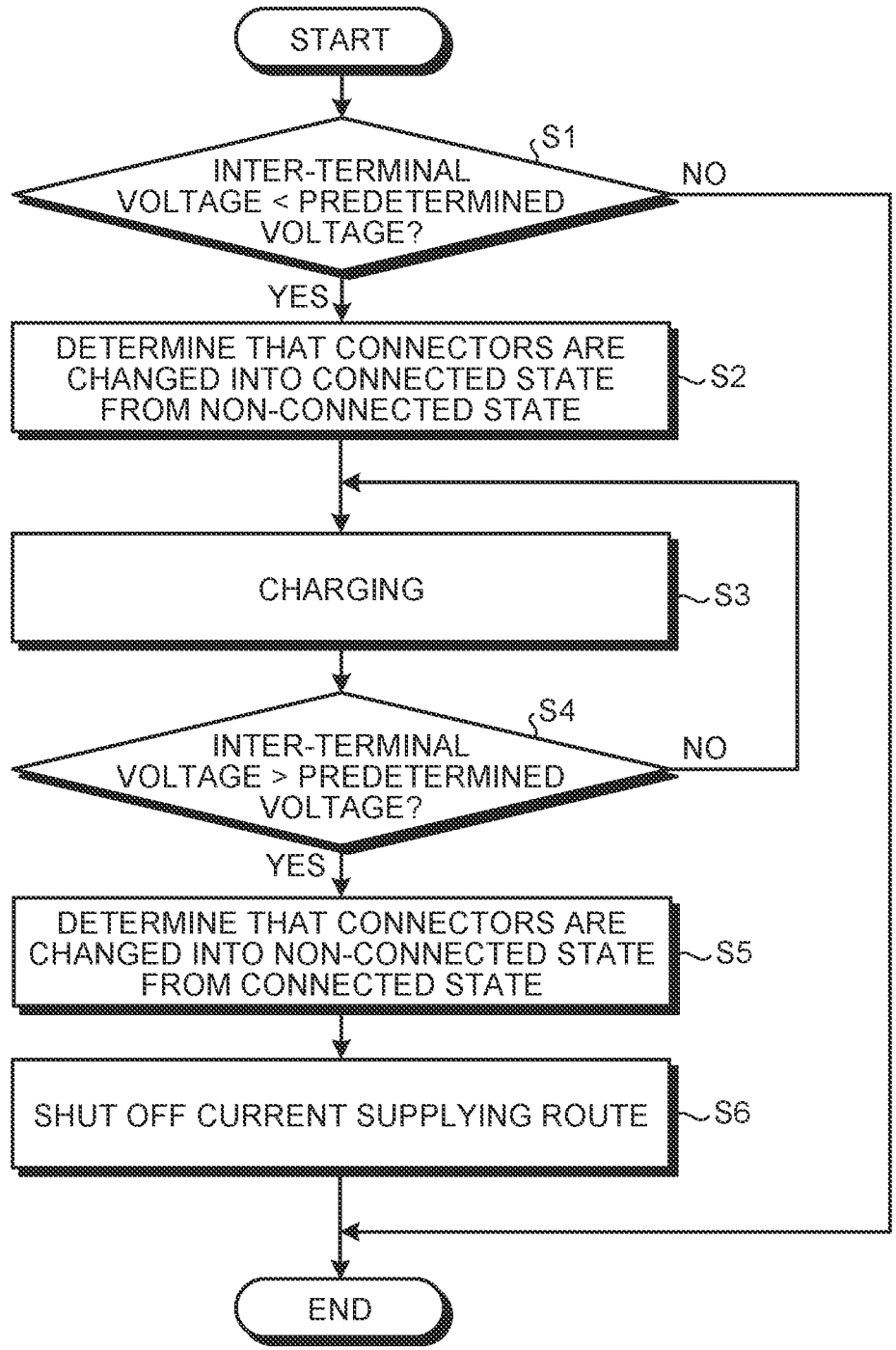
FIG. 7 is a flowchart illustrating one example of a process to be executed by the device-side controller according to the embodiment.

The device-side controller 34 repeatedly executes the process illustrated in FIG. 7. The device-side controller 34 determines whether or not the voltage value Vcc that is an inter-terminal voltage is smaller than a predetermined voltage (Step S1). In a case where an inter-terminal voltage is equal to or more than the predetermined voltage, the device-side controller 34 ends the processing, and starts the processing from Step S1.

In a case where an inter-terminal voltage is smaller than the predetermined voltage, the device-side controller 34 determines that the charging-device-side charging connector 46 and the vehicle-side charging connector 50 have changed into a connected state from a non-connected state (Step S2), and start charging on the basis of a set condition related to charging (Step S3). Next, the device-side controller 34 determines whether or not an inter-terminal voltage is greater than the predetermined voltage (Step S4).

In a case where an inter-terminal voltage is equal to or less than the predetermined voltage, the device-side controller 34 continues charging. In a case where an inter-terminal voltage is larger than the predetermined voltage, the device-side controller 34 determines that the charging-device-side charging connector 46 and the vehicle-side charging connector 50 are changed from a connected state into a non-connected state (Step S5). Next, the device-side controller 34 shuts off the current supplying route 58 (Step S6), ends the processing, and restarts the processing from Step S1. In Step S3, the device-side controller 34 executes authentication recognition on the vehicle-side device 20 on the basis of information received from the vehicle-side device 20, determines whether or not charging is possible, and sets a condition related to charging. In Step 2, in a case where determining that the charging-device-side charging connector 46 and the vehicle-side charging connector 50 are changed from a non-connected state into a connected state, the device-side controller 34 may start charging.

Figure 8:
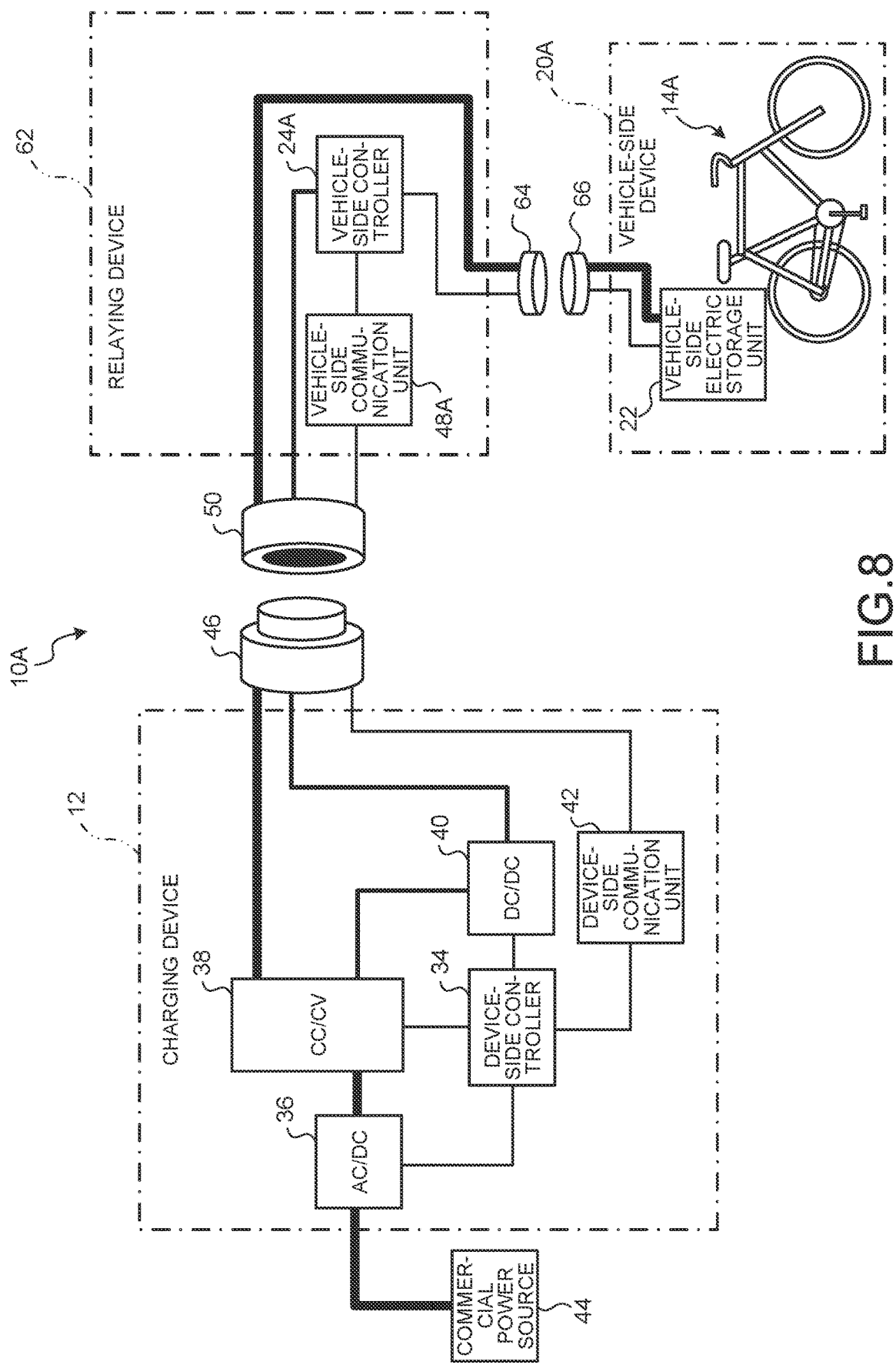
FIG. 8 is a schematic diagram illustrating configurations of a charging device and a vehicle-side device according to a modification of the embodiment.

A schematic configuration of a charging system 10A according to a modification is illustrated in FIG. 8. As illustrated in FIG. 8, the charging system 10A includes the charging device 12, a relaying device 62, a vehicle-side device 20A. The charging device 12 has the same configuration as that of the charging device 12 illustrated in FIG. 2. A configuration of the vehicle-side device 20A is different from a configuration of the vehicle-side device 20 illustrated in FIG. 2 in that the vehicle-side device 20A does not include the vehicle-side controller 24 and the vehicle-side communication unit 48. Illustration thereof is omitted in FIG. 8, a vehicle 14A includes a controller that controls operations of the drive unit 32.

The relaying device 62 includes a vehicle-side controller 24A and a vehicle-side communication unit 48A. The vehicle-side controller 24A executes processes related to charging of the vehicle-side electric storage unit 22 among the processes illustrated in FIG. 2 which are to be executed by the vehicle-side controller 24. The vehicle-side communication unit 48A has the same configuration as that of the vehicle-side communication unit 48 illustrated in FIG. 2. If the charging-device-side charging connector 46 and the vehicle-side charging connector 50 are connected to each other, the charging device 12 and the relaying device 62 are turned into a connected state. The charging-device-side charging connector 46 has the same configuration as that of the charging-device-side charging connector 46 illustrated in FIG. 4. The vehicle-side charging connector 50 has the same configuration as that of the vehicle-side charging connector 50 illustrated in FIG. 3.

If a relaying-device-side charging connector 64 and a vehicle-device-side charging connector 66 are connected to each other, the relaying device 62 and the vehicle-side device 20A are turned into a connected state. The relaying-device-side charging connector 64 has the same configuration as that of the charging-device-side charging connector 46 illustrated in FIG. 4. The vehicle-device-side charging connector 66 has the same configuration as that of the vehicle-side charging connector 50 illustrated in FIG. 3.

The charging device 12 supplies electric power to the vehicle-side device 20A via the relaying device 62 so as to charge the vehicle-side electric storage unit 22. According to the charging system 10A, the vehicle-side electric storage unit 22 is able to be charged with respect to the already-existing vehicle 14A that does not include the vehicle-side controller 24 and the vehicle-side communication unit 48 illustrated in FIG. 8. The charging device 12 is capable of using the first device-side connection terminal 46A also as a terminal that supplies electric power to the vehicle-side communication unit 48A and a connection/disconnection detecting terminal between the charging-device-side charging connector 46 and the vehicle-side charging connector 50.

While certain embodiment and modification of the present invention have been described, the description thereof is not intended to limit the embodiments. The constituting elements described herein include elements easily achieved by one skilled in the art, elements being substantially the same as the constituting elements, and elements within the scope of equivalents of the constituting elements. The constituting elements described herein can be combined in an appropriate manner. Furthermore, various omissions, substitutions and changes in the constituting elements can be made without departing from the spirit of the embodiment.

The expression of "at least one" described in this specification means "one or more" desired choices. The expression of "at least one" described in this specification means, as one example, "one choice alone" or "both of two choices" when there preset two choices. The expression of "at least one" described in this specification means, as another example, "one choice alone" or "combination of two or more arbitrary choices" when the number of choices is equal to or more than three.

What is claimed is:

1. A charging device for charging a vehicle-side electric storage unit of a vehicle-side device having a first vehicle-side connection terminal, a second vehicle-side connection terminal and a vehicle-side controller electrically connected between the first vehicle-side connection terminal and the second vehicle-side connection terminal, the charging device comprising:
   a first power source;
   a first device-side connection terminal being connectable to the first vehicle-side connection terminal;
   a second device-side connection terminal being connectable to the second vehicle-side connection terminal;
   a first resistance electrically connected between the first power source and the first device-side connection terminal;
   a detection unit configured to detect an inter-terminal voltage between the first device-side connection terminal and the second device-side connection terminal, the detection unit including a comparator that compares the inter-terminal voltage to a predetermined voltage; and
   a device-side controller configured to determine a change from a connected state to a non-connected state has occurred upon determining the inter-terminal voltage detected by the detection unit is greater than the predetermined voltage,
   the connected state being a state where the first device-side connection terminal and the first vehicle-side connection terminal are connected to each other and the second device-side connection terminal and the second vehicle-side connection terminal are connected to each other, and the non-connected state being a state where the first device-side connection terminal and the first vehicle-side connection terminal are not connected to each other and the second device-side connection terminal and the second vehicle-side connection terminal are not connected to each other.

2. The charging device according to claim 1, further comprising:
   a second power source;
   a third device-side connection terminal that is connectable to a third vehicle-side connection terminal electrically connected of the vehicle-side electric storage unit of the vehicle-side device;
   a fourth device-side connection terminal that is connectable to a fourth vehicle-side connection terminal electrically connected of the vehicle-side electric storage unit of the vehicle-side device; and
   a shutting unit configured to shut off a current supplying route through which a current is supplied from the second power source to the third device-side connection terminal.

3. The charging device according to claim 2, wherein
   the first device-side connection terminal and the third device-side connection terminal are terminals that are individually provided, and
   the second device-side connection terminal is a terminal that also serves as the fourth device-side connection terminal.

4. The charging device according to claim 2, wherein
   the device-side controller is configured to cause the shutting unit to shut off the current supplying route in a state where the device-side controller determines the change has occurred from the connected state to the non-connected state.

5. The charging device according to claim 1, wherein
   a second resistance is connected between the first vehicle-side connection terminal and the second vehicle-side connection terminal electrically in parallel to the vehicle-side controller.

6. The charging device according to claim 5, wherein
   a resistance value of the first resistance is smaller than a resistance value of the second resistance.

7. The charging device according to claim 1, wherein
   a resistance value of the first resistance is set such that a voltage equal to or more than a lowest voltage needed for operation of the vehicle-side controller is output from the first device-side connection terminal.

8. The charging device according to claim 7, wherein
   a voltage value of the lowest voltage is 5 [V], and
   a voltage value of the first power source is 7 [V].

9. The charging device according to claim 7, wherein
   a voltage value of the predetermined voltage is between a voltage value of the first power source and a voltage value of the lowest voltage.

10. The charging device according to claim 5, further comprising:
    a third resistance electrically connected to the first power source; and
    a fourth resistance electrically connected between the third resistance and the second device-side connection terminal,
    the comparator being configured to compare the inter-terminal voltage and the predetermined voltage between the third resistance and the fourth resistance with each other.

11. The charging device according to claim 10, wherein
    a resistance value of the fourth resistance is greater than five times of a resistance value of the third resistance.

12. The charging device according to claim 10, wherein
    a resistance value of the third resistance is greater than a hundred times of a resistance value of the first resistance.

13. The charging device according to claim 10, wherein
    a resistance value of the first resistance is 10 [Ω], and
    a resistance value of the second resistance is 50 [Ω].

14. The charging device according to claim 10, wherein
    a resistance value of the third resistance is 5 [kΩ], and
    a resistance value of the fourth resistance is 50 [kΩ].

15. The charging device according to claim 1, further comprising:
    a device-side control terminal that is connectable to a vehicle-side control terminal.

16. The charging device according to claim 1, wherein
the device-side controller is configured to determine the change has occurred from the non-connected state to the connected state upon determining the inter-terminal voltage detected by the detection unit has become smaller than the predetermined voltage.

17. A charging system comprising the charging device according to claim 1; and further comprising:
the vehicle-side device of which the vehicle-side controller is electrically connected between the first vehicle-side connection terminal and the second vehicle-side connection terminal.

\* \* \* \* \*